United States Patent [19]

Hodes et al.

[11] 3,875,025

[45] Apr. 1, 1975

[54] METHOD OF FORMING A POLYMER COATING

[75] Inventors: Harvey A. Hodes, Eatontown, N.J.; James F. Sobieski, Saint Paul, Minn.; Michael C. Zerner, Uppsala, Sweden

[73] Assignee: The United States of America as represented by the Secretary of the Army, Washington, D.C.

[22] Filed: Apr. 18, 1973

[21] Appl. No.: 352,364

Related U.S. Application Data

[62] Division of Ser. No. 195,058, Nov. 2, 1971, abandoned, which is a division of Ser. No. 41,113, May 27, 1970, Pat. No. 3,650,909.

[52] U.S. Cl.............. 204/18 PC, 117/1.7, 117/37, 117/49, 117/132 C, 117/42, 117/8
[51] Int. Cl............................. B44c 1/04, B44d 1/36
[58] Field of Search ......... 204/18 PC, 72, 130, 140, 204/34, 181, 143, 145; 117/42, 49, DIG. 3, 132 C, 8, 37, 1.7

[56] References Cited

UNITED STATES PATENTS

| | | | |
|---|---|---|---|
| 2,643,222 | 6/1953 | Cox | 204/145 |
| 2,683,692 | 7/1954 | Harris | 204/145 |
| 2,915,444 | 12/1959 | Meyer | 204/145 |
| 3,409,431 | 11/1968 | Deutsch | 204/18 |
| 3,436,215 | 4/1969 | Levinos et al. | 96/1 |
| 3,464,849 | 9/1969 | Ehrig et al. | 117/132 |
| 3,464,960 | 9/1969 | Sobieski et al. | 204/72 |
| 3,650,909 | 3/1972 | Hodes et al. | 204/18 PC |

*Primary Examiner*—T. M. Tufariello
*Attorney, Agent, or Firm*—Nathan Edelberg; Robert P. Gibson; Roy E. Gordon

[57] ABSTRACT

Polymer is formed on metal surfaces such as iron, chromium, cobalt or nickel by first making the metal surface the cathode of a light responsive electrolytic cell. A potential is then applied across the electrodes of the electrolytic cell causing image-wise passage of current therethrough. Polymer may then be deposited in an image-wise fashion by immersing the metal surface in an acid-peroxide-monomer solution.

1 Claim, No Drawings

METHOD OF FORMING A POLYMER COATING

The invention described herein may be manufactured, used, and licensed by or for the Government for governmental purposes without the payment to us of any royalty thereon.

This is a division of application Ser. No. 195,058, filed Nov. 2, 1971 now abandoned, which in turn was a divisional application under 37 CFR 1.60 of application Ser. No. 41,113 filed May 27, 1970, now U.S. Pat. No. 3,650,909.

BACKGROUND OF THE INVENTION

This invention relates in general to the art of polymer deposition on metallic surfaces, and in particular to the art of image-wise deposition of polymer on metallic surfaces.

Photoelectrolytic polymerization systems in which a photoconductive layer is in contact with a monomer containing image recording layer overlying an electrically conductive metallic substrate have been previously disclosed and claimed in the U.S. patent applications of Hodes, Sobieski and Zerner for Photoelectric Imaging Device, Ser. Nos. 670,815 and 670,816 filed Sept. 26, 1967, now abandoned. In such systems, an electric potential is applied across the device and the current that flows is proportional to the incident light. This flow of current causes initiation of polymerization and creates the polymer image in the film.

One of the difficulties encountered with such systems is that the monomer compositions included in the image recording layer are not completely stable; that is they are subject to autopolymerization or deterioration on prolonged contact with the metallic substrate. Moreover, since the monomer composition is a liquid, the usual binders are needed which may interfere with the polymerization reactions. Then too, in conventional photoelectrolytic imaging devices, the only image that can be obtained is a reversal image.

SUMMARY OF THE INVENTION

The general object of this invention is to provide a method of photoelectrolytic initiated polymerization in which the monomer is not in direct contact with the electrically conductive substrate until the actual moment of polymerization so that autopolymerization or deterioriation of the monomer is avoided. A further object of this invention is to provide such a method in which either a positive or a negative image can be obtained. A still further object of the invention is to provide such a method that does not require binders that interfere with the polymerization reactions.

According to the invention, polymer is formed on a metal surface such as a stainless steel plate by first making the plate the cathode of a light responsive electrolytic cell. A potential is then applied across the electrodes of the cell causing image-wise passage of current therethrough. Polymer is then deposited in an image-wise fashion by immersing the plate in an acid-peroxide-monomer solution.

The essence of this invention is the activation and passivation of a metal surface as a means of electrically initiated polymerization, without the usual flow of current.

The method of the invention makes use of the fact that a metal surface is activated when it is made a cathode and deactivated or made passive when it is made an anode. The term passivation as used herein refers to any means of forming an oxide layer on a metal surface so as to render it almost immune to chemical reaction. Activation is simply a way of removing the oxide layer so as to make the base metal more reactive. Most metals or alloys can be made passive or active by simple chemical treatment or electrolytic action. For example, stainless steel, platinum or gold are naturally passive. Cobalt, nickel, chromium, or iron can be made passive by immersion in an oxidizing solution such as dichromate or nitric acid, or by being made the anode of an electrolytic cell. Conversely many alloys or metals are made active when made the cathode of any electrolytic cell. In this active state they are more reactive chemically, and undergo dissolution in acid quite readily.

If a metal or alloy, say stainless steel, previously activated, is dipped into a solution containing strong acid, monomer, and peroxide, polymerization will be initiated in the absence of current flow. The activated electrode surface reacts with the acid present and dissolves, principally as ferrous ion according to the following equation:

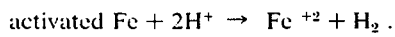

The ferrous ions then react with the peroxide present to form hydroxyl free radicals which initiate polymerization according to the equation:

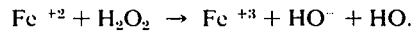

Polymer is formed directly on the steel electrode. Polymerization continues until the build up of polymer on the electrode surface insulates the metal from further contact with the acid.

DESCRIPTION OF THE PREFERRED EMBODIMENT

EXAMPLE 1

In this case, a photoelectric imaging device serves as a light responsive electrolytic cell. The cell includes a photoconductive layer as for example, a layer of cadmium sulfide sandwiched between a Nesa glass electrode and a stainless steel plate. The plate is separated from the photoconductive layer by an electrically conducting medium such as a solution of sodium chloride in agar gel. The Nesa electrode is made the anode and the stainless steel plate the cathode. An image is then focused on the electrolytic cell while applying a potential of about 60 to 100 volts across the electrodes for several reconds. The gel is stripped away and the plate immersed in a water solution containing 10 percent by weight of acrylamide and 1 percent by weight of methylenebisacrylamide, the solution also being 1 Normal in hydrochloric acid and containing 0.1 percent of hydrogen peroxide. Within two minutes, polymer is formed in areas where current has passed. The polymer can then be dyed to make the image visible by dipping in a saturated aqueous dye solution, such as Congo red or methylene blue.

EXAMPLE 2

A reversal of the image of Example 1 is made as follows: The stainless steel plate is made the cathode of any type of electrolytic cell. The anode may be any electrically conducting material, such as graphite, iron, steel, platinum, etc. The cathode is immersed completely into the electrolytic solution while current flows. After a few seconds, current is shut off. The steel cathode is now activated. The sandwich of Example 1 is again assembled exactly as before. This time, however, the polarity is reversed. The Nesa glass electrode is now the cathode, and the stainless steel is the anode. An exposure is made exactly as before. This time the image is an exact reversal of the previous image. The reason for this is that when a metal surface is made the anode, oxidation occurs. In effect, we have passivated the areas of the steel where current flows. Of course, current flows corresponding to the image pattern, and the brightest part of the image corresponds to the areas of greatest oxidation, or more properly, passivation. The steel anode is dipped into monomer, and the areas polymerized correspond to the areas where no current flowed.

EXAMPLE 3

In this example, the electrolytic cell is a sandwich including a stainless steel plate as the cathode separated by a conducting medium of sodium chloride in methocel from the anode. The anode in this case is a plate of any electrically conducting metal in which the desired image pattern is cut through the plate. A potential of about 60 to 100 volts is applied across the electrodes for about 15 seconds. The stainless steel as the cathode becomes activated in image-wise fashion corresponding to the image pattern cut through the anode. The cathode is then removed and treated as in Example 1.

EXAMPLE 4

A stainless steel plate normally passive, is made the cathode of any electrolytic cell. The simplest way to do this is as follows: A beaker, large enough to cover the stainless steel cathode and the anode, is filled with water containing a little sodium chloride as electrolyte. The anode may be any kind of conductor, even another piece of stainless steel. A potential of about 60 to 100 volts is applied across the electrodes for a few seconds, and then shut off. The stainless steel plate is now activated. This is because activation occurs at the cathode. Stainless steel in its natural state is always passive, that is, it is covered with an oxide layer which makes it very resistant to acid attack. The sole function of activation is to remove this oxide layer so as to leave "active" or bare metal, which reacts with the acid-monomer-peroxide solution to form polymer. Now, if an image pattern is wanted, the following procedure is carried out. Before the stainless steel is activated, that is, in its natural passive state, the desired image is painted or stenciled on the steel plate with a non-electrically conducting paint or ink. Then, this steel plate is activated exactly as described. What happens is that the steel plate is activated, except where the image pattern is. The image pattern, of course, simply prevents any electrolysis reaction from taking place over its area. The image pattern is then dissolved in a suitable solvent. This steel electrode is then dipped into the acid-monomer-peroxide solution. Polymer will form everywhere except on the image pattern, which is, of course, still passive, and hence unreactive in the acid-monomer-peroxide.

EXAMPLE 5

A reversal of the image of Example 4 is made as follows: First, the entire steel electrode is activated. Then, an image pattern is painted or stenciled on the activated surface as in Example 4. Then, this electrode and some other electrode, such as graphite, platinum, etc., is inserted into the beaker containing water and NaCl; the polarity is reversed, and a potential of about 60 to 100 volts is applied for a few seconds. The steel electrode containing the image pattern has now been made the anode, and an oxide layer will be formed (passivation) everywhere except where the image pattern is. The image pattern prevents any electrolytic reaction taking place under its area. Also remember that this image pattern is painted or stenciled over the activated surface of the steel plate. Now dissolve this image pattern in a suitable solvent, and then dip this electrode surface into the acid-monomer-peroxide. Polymer forms only where the image pattern was. The reason is that only the image pattern area is active; the rest of the plate is made passive, that is unreactive, when the polarity is reversed.

In the method of the invention, the particular composition of the conducting medium is not critical. Thus, a highly ionized salt such as sodium chloride or potassium chloride can be used as the electrolyte in a medium such as methocel, agar gel or carboxy methyl cellulose. It is only necessary that the conducting medium not take part in any electrolytic reaction.

As to the polymerizable monomer(s) that can be used in the acid-peroxide-monomer solution, any water soluble vinyl compound is intended, such as acrylamide, N, N'-methylenebisacrylamide, N, N'-trimethylenebisacrylamide, omega acrylamidocaproic acid, N-vinyl-2-pyrrolidone, or combinations thereof. The polymerizable monomer(s) amounts to about 3 to 50 percent by weight of the solution. The acid used should be a strong acid that is soluble in the solvent used, preferably water. The use of hydrochloric acid or sulfuric acid is preferred. The concentration of the acid is adjusted so that active areas of the plate are preferentially attacked. When stainless steel is used as the plate, a hydrochloric or sulfuric acid concentration of between 0.5 and 1.3 Normal has been found most suitable. An initiator such as hydrogen peroxide is also included to initiate free radical polymerization. The concentration of initiator will vary with the acid concentration. In the instance where hydrogen peroxide is the initiator, the concentration ranges from 0.03 to 0.3 percent by weight. Certain sensitizers can also be added to the solution to make the polymerization more efficient. Such sensitizers include hydroxylamine hydrochloride or diphenylcarbazide in an amount of about 0.01 weight percent.

After polymer has been deposited on the metallic plate, one has a tough coating of polymer in image areas. This can be used directly as a photograph since the image has the property of continuous tone. It has an advantage over other techniques of image-wise polymerization in that the film consists very simply of the polymerized monomer(s) alone. That is, the binder coating has been eliminated. Furthermore, there is no washing away step required to remove the unpolymerized areas.

It should also be pointed out that certain metals such as stainless steel when once activated, remain in the active state for periods of up to six to twelve hours. It is possible, therefore, to form an image-wise exposure pattern directly on the steel substrate, and then develop the latent image several hours later. This is of advantage where proper processing facilities may not be immediately available such as in aerial surveillance.

The method of the invention is also of use in the graphic arts field, as well as in the printing of microcircuits in the electronics field. In this connection, the ability to eliminate the usual photoconductive coating, and the focusing of an image on it, produces a marked improvement in image sharpness. This is of critical importance in the forming of microcircuits.

We wish it to be understood that we do not desire to be limited to the exact details of construction as described, for obvious modifications will occur to a person skilled in the art.

What is claimed is:

1. A method of forming a polymer image on a stainless steel plate including the steps of
   A. activating the stainless steel plate,
   B. making the activated stainless steel plate the anode of a light responsive electrolytic cell, said cell including a layer of photoconductive material sanwiched between a Nesa electrode as the cathode and said anode, the plate and the photoconductive layer being separated by an electrically conducting medium,
   C. applying a potential of about 60 to 100 volts across the electrodes of said cell for several seconds while focusing an image on the cell,
   D. removing said plate from said cell, and
   E. immersing said plate in an aqueous solution of about 3 to 50 percent by weight of water soluble vinyl compound, the solution also being between 0.5 and 1.3 Normal in hydrochloric acid and containing 0.03 to 0.3 percent by weight of hydrogen peroxide to cause polymer to be deposited on the plate in image-wise fashion.

* * * * *